UNITED STATES PATENT OFFICE.

FREDERICK GREENING, OF PLUMSTEAD COMMON, ENGLAND, ASSIGNOR TO FREDERICK HENRY BOWDEN, OF LONDON, ENGLAND, AND SYDNEY HERBERT DODD, OF BLACKHEATH, ENGLAND.

MANUFACTURE OF ELECTRICALLY-INSULATING AND WATERPROOFING MATERIALS.

SPECIFICATION forming part of Letters Patent No. 701,713, dated June 3, 1902.

Application filed December 6, 1900. Serial No. 38,857. (No specimens.)

*To all whom it may concern:*

Be it known that I, FREDERICK GREENING, a citizen of England, residing at 1 Acacia Parade, Plumstead Common, in the county of Kent, England, have invented a certain new and useful Improvement in the Manufacture of Electrically-Insulating and Waterproofing Material, (for which I have applied for a patent in Great Britain, dated May 9, 1900, No. 8,575,) of which the following is a specification.

This invention relates to the manufacture of an electrically-insulating and waterproofing material, which I effect as follows: I melt anthracene, which as usually purchased contains a large proportion of anthracene-oil, and while it is melted I mix with it pulverized alkaline carbonate, preferably barium carbonate, by which such acid as may be present is neutralized and impurities are carried down. I separate the molten liquid from the deposited impurities, and while it is still in a liquid condition I add to it copal resin, such as gum-animi or gum-elemi, and maintain the heat of the mixture at a temperature not exceeding 400° Fahrenheit until combination of the gum with the anthracene is completed, as is indicated by cessation of the ebullition. The proportion of the gum to the anthracene may be varied. When the material is desired to be comparatively soft and flexible, I use about equal weights of gum and anthracene. When great plasticity and flexibility are required, as for insulating conductors, I add to the molten material any non-drying oil, such as bituminous-shale oil or crude castor-oil, in more or less quantity, according as the product is desired to be more or less plastic and flexible. When the material is desired to be hard and rigid, I use a larger proportion of gum, up to six parts of gum to one of anthracene.

The material produced as above described can be molded in any desired form for electrically insulating or like purposes. It can be dissolved in volatile spirits, oils, naphtha, and other known solvents, so as to produce a paint or varnish for insulating and waterproofing. It can also be fused and mixed with drying-oil for like purposes.

Having thus described the nature of this invention and the best means I know for carrying the same into practical effect, I claim—

1. The herein-described process for the manufacture of an electrically-insulating and waterproofing material, consisting in mixing with fused anthracene a proportion of a copal resin.

2. As a new product, the electrically-insulating and waterproofing material produced by combining anthracene with a copal resin.

In testimony whereof I have hereunto set my hand in presence of two subscribing witnesses.

FREDK. GREENING.

Witnesses:
   GERALD L. SMITH,
   EDWARD GARDNER.